United States Patent [19]

Leiber et al.

[11] 4,255,931

[45] Mar. 17, 1981

[54] HYDRAULIC BRAKE BOOSTER FOR A VEHICULAR BRAKE SYSTEM

[75] Inventors: Heinz Leiber, Leimen; Robert Mergenthaler, Heidelberg, both of Fed. Rep. of Germany

[73] Assignee: Robert Bosch GmbH, Stuttgart, Fed. Rep. of Germany

[21] Appl. No.: 44,885

[22] Filed: Jun. 4, 1979

[30] Foreign Application Priority Data

Jun. 8, 1978 [DE] Fed. Rep. of Germany ....... 2825132

[51] Int. Cl.³ .................... B60T 13/00; B60T 11/32; F15B 13/10
[52] U.S. Cl. .................... 60/547 A; 60/581; 60/582; 91/391 R
[58] Field of Search ............ 91/1, 369 R, 391 R; 60/534, 535, 547 A, 552, 553, 554, 403, 418, 545, 546, 547, 581, 582, 585

[56] References Cited

U.S. PATENT DOCUMENTS

| | | | |
|---|---|---|---|
| 3,625,005 | 12/1971 | Saunders | 91/391 R |
| 3,751,919 | 8/1973 | Ron | 91/391 R |
| 3,978,667 | 9/1976 | Ohara | 60/547 |
| 4,034,566 | 7/1977 | Suketomo | 60/582 |
| 4,197,710 | 4/1980 | Leiber | 60/547 A |

*Primary Examiner*—Edward J. McCarthy
*Attorney, Agent, or Firm*—Edwin E. Greigg

[57] ABSTRACT

A hydraulic brake booster for a vehicle brake system which has a control valve, actuatable via an excursion-limiting spring, which directs the flow of pressure medium from a supply source as an auxiliary force means. The excursion-limiting spring disposed subsequent to the brake pedal provides for sensitive response on the part of the control valve. In event the auxiliary force fails, the excursion-limiting spring is made ineffective so that pedal travel does not occur without being utilized. A shut-off mechanism is included to make the excursion-limiting spring ineffective has a shut-off member dependent on brake actuation and to which a motion pulse dependent on brake actuation can be imparted in the area of its outset position. In this manner, the shut-off mechanism is used during each occurrence of braking and thus cannot seize as a result of corrosion.

9 Claims, 1 Drawing Figure

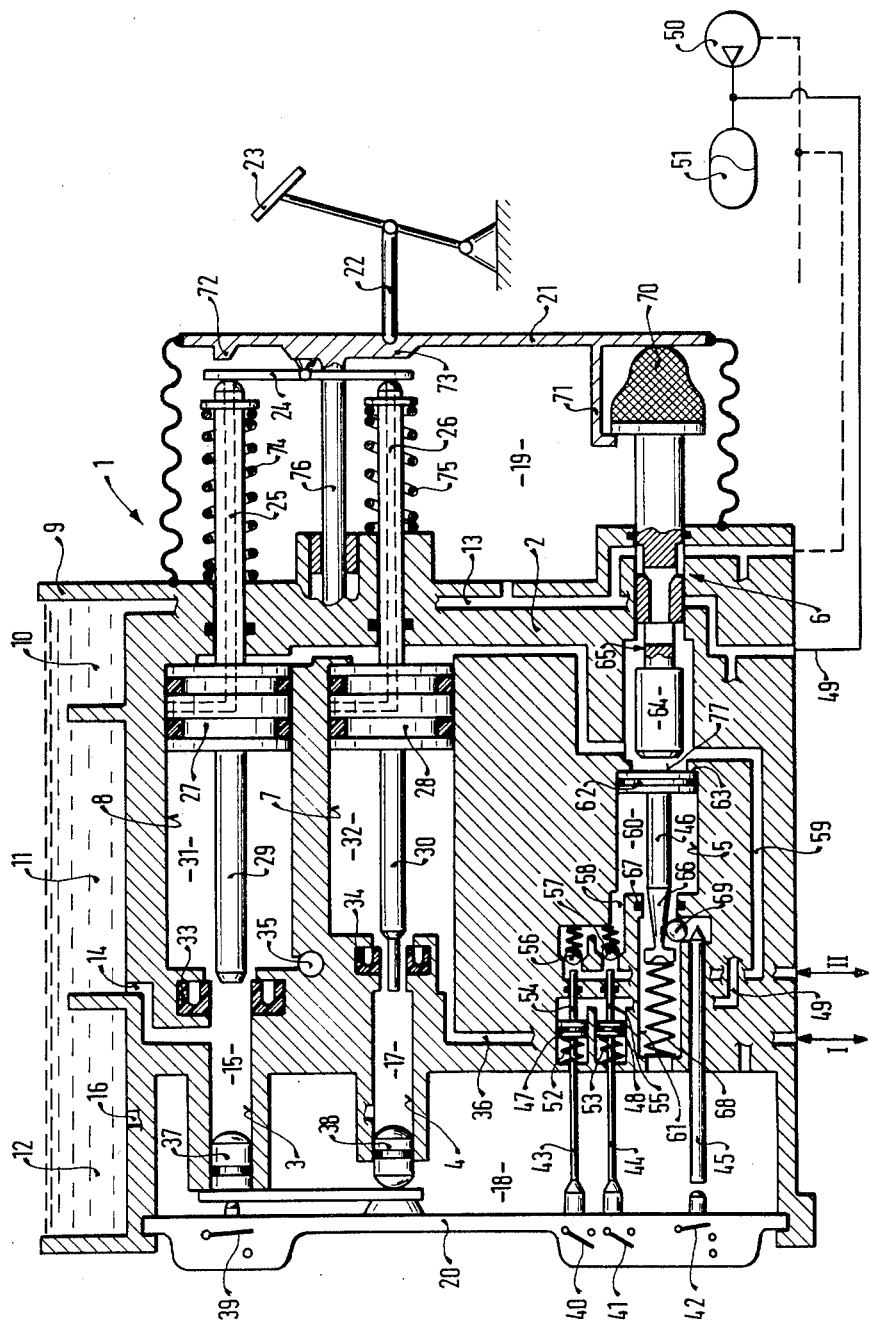

4,255,931

HYDRAULIC BRAKE BOOSTER FOR A VEHICULAR BRAKE SYSTEM

BACKGROUND OF THE INVENTION

The invention relates to a hydraulic brake booster for a dual circuit braking system such as that described in the German Pat. No. 2,312,641. In brake boosters of this type, the problem arises that if the reservoir pressure fails, the travel spring excursion represents an unnecessary waste motion which thus lengthens the pedal travel of the brake booster upon the failure of the auxiliary energy source.

The U.S. Pat. No. 4,094,554 discloses a solution for this problem by provision of a shut-off mechanism for the travel spring excursion which is dependent upon supply pressure. However, a shut-off mechanism of the above-noted type provides a consequent disadvantage that, because supply pressure failure seldom occurs, the mechanism is actuated only at rare and infrequent intervals of time. As a result of this inactivity, the mechanism can become sluggish and may not be in operable condition when needed, as in case of emergency.

In integrated hydraulic brake boosters having a control valve located in parallel with the booster cylinder or cylinders, the problem is still more complex. The push rod which actuates the control rod must come into contact with a stop after it has switched the control valve to the braking direction in order to provide the driver with braking "feel", i.e., with a sense of the braking force which has been brought to bear. This is achieved via the travel spring excursion disposed between the control valve and the brake pedal. Should this stop not be present upon attaining the point where the control valve becomes ineffective, then the pedal force would increase no further; instead, the pedal force would remain constant until the pedal push rod finally reached the main cylinder piston. Only then, upon a continuing depression of the pedal, would a further increase in the pedal return force or brake feel occur. Such a characteristic in a vehicular braking system is considered unfavorable and undesirable from the standpoint of human engineering.

To alleviate this braking characteristic, it is known in the art to use an auxiliary piston dependent upon supply pressure; thus, if the supply pressure fails, this auxiliary piston pushes open a check valve which previously had retained closed a chamber, the movable wall of which chamber included a support piston for the control valve. Such a mechanism also suffers from the disadvantage that it is actuated very seldom, so that it may become sluggish or inoperable. Thus, in the event of a failure, a dangerous defect in the shut-off mechanism which would hinder optimal functioning of the brake booster could remain undetected.

OBJECT AND SUMMARY OF THE INVENTION

Accordingly, it is the principal object of the present invention to avoid the disadvantages associated with known brake boosters and to create a brake booster of the type hereinabove described in which the shut-off mechanism is operated upon each application of the brakes and, thus, cannot seize as a result of corrosion.

It is another object of the invention that the motion of a piston in the shut-off mechanism can be utilized to actuate a switch, such as a brake light switch.

It is a further object of the invention to provide an auxiliary switch position for the above-mentioned switch, whereby the effectiveness of the stop can be tested.

This latter objective is achieved, according to the invention, in the following manner. If the hydraulic system is operating normally, so that the control valve is fully ineffective, then the shut-off piston stroke is only a short distance. If, however, the stroke is so long that the piston reaches the auxiliary switch position, then the stop effectiveness of the shut-off mechanism is indicated to be malfunctional.

The foregoing objects of the invention are achieved, according to the invention, in the following manner. If the hydraulic system fails due to a loss of fluid supply, the chamber defined by the shut-off piston is opened by valve means, which, for the sake of safety, comprises two valves. The redundancy of providing two valves is particularly appropriate when two switching pistons are used simultaneously and both are exposed to reservoir pressure, as it is conceivable that one switching piston might be defective and thus not execute the requisite stroke. This redundancy is of particularly critical importance in the case where the motion of one switching piston is used for the purpose of reservoir charging, either by driving a mechanical valve or by closing an electrical contact. If such a switching piston were to remain stuck in the terminal position, for example, where the contact remains open, then while the reservoir pressure is dropping, the reservoir is no longer being charged but, on the other hand, there is also no warning signal given to the vehicle operator. If this happens, then the stop remains effective because of the single closed valve, resulting in the exertion of only a relatively small braking effect, corresponding to the excursion of the travel-limiting spring. Whereas, by using two switching pistons, a genuine, active safety means is provided, because the joint probability of a simultaneous failure of both switching pistons is very low.

The invention will be better understood and further objects and advantages thereof will become more readily apparent from a consideration of the ensuing detailed description of the preferred embodiment illustrated in the drawing, in which

BRIEF DESCRIPTION OF THE DRAWING

The single FIGURE is a cross-sectional view of the brake booster of the invention described herein.

DESCRIPTION OF THE PREFERRED EMBODIMENT

Turning now to the drawing, it will be seen that a hydraulic brake booster 1 is provided with a housing 2, having three parallel bores 3, 4 and 5, recessed therein at several points. Bore 5 is provided for a control valve assembly 6 while bores 3, 4 are provided for two main cylinders 7, 8, which comprise booster cylinders. On the housing 2 there is a refill container 9 which has three reservoir chambers 10, 11 and 12. The chamber 10 is connected via a channel 13 to the control valve assembly 6; the chamber 11 communicated via a channel 14 with a refill chamber 15 of the main cylinder 8 and from chamber 12, a channel 16 leads to a refill chamber 17 of the main cylinder 7.

The three bores 3, 4 and 5 communicate with fluid-filled chambers 18 and 19, chamber 18 forming an enclosure with the housing by a flat cap 20 while chamber 19 is enclosed against the housing via cap 21 having a diaphragm attachment. Both chambers 18 and 19 communicate via channels with the refill container 9.

The cap 21 can be varied in its axial offset from the housing 2 by means of a pedal push rod 22, which is articulatably mounted on a brake pedal 23. The cap 21 supports a crossbar 24 within the chamber 19 mounted so as to cooperate at its opposite extremities with spring-loaded piston push rods 25 and 26, which rods are positively mounted on brake pistons 27 and 28, respectively. The brake pistons 27 and 28 are axially movable within the main cylinders 7 and 8. Pistons 27 and 28 are further provided with piston rods 29 and 30, rrespectively, which axially extend through their associated work chambers 31 and 32, respectively, so that, upon executing a short stroke, each projects into its respective annular seal 33 and 34, which seals are disposed adjacent the apertures of the refill chambers 15 and 17, respectively. Each work chamber 31 and 32 communicates via a channel 35 and 36, respectively, and via one brake-circuit connection I and II, respectively, with the respective front and rear wheel brake cylinders, not shown, of a motor vehicle.

The extremities of the refill chambers 15 and 17 adjacent to the cap 20 are sealed by means of plugs 37 and 38, respectively. At least one of said plugs, here plug 37 as shown, is adapted to actuate a pressure switch 39.

Proximate to the location of the control valve assembly 6, the cap 20 is provided with three further switches 40, 41 and 42, which comprise a charge function switch 40, a pressure deficiency switch 41, and a brake light switch 42 having two switch positions. The switches 40, 41 and 42 are actuatable, respectively, via piston rods 43, 44 and 45, which rods are themselves actuated by means of piston rod 46. Piston rods 43 and 44 are mounted upon reservoir pressure pistons 47 and 48, respectively, which are commonly connected via a channel 49 with a reservoir 51 supplied by a pump 50 (shown schematically). Pistons 47 and 48 are movable under reservoir or supply pressure against the force of springs 52 and 53. Each piston 47, 48 is provided with a push rod 54 and 55, respectively, for actuation of a check valve 56 and 57, respectively, each being disposed in a respective connecting line 58 and 59 between a shut-off piston chamber 60 and the primary side 77 of the shut-off piston 62.

The shut-off piston chamber 60 is defined by a shut-off piston 62, which assumes a first position when the brakes are in the released state in contact with an abutment 63 provided at one end of bore 5. In this first position of the piston, it is axially removed from but adjacent to an extremity 64 of a control plunger 65 of the control valve assembly. The distance between piston 62 and extremity 64 in this first position is somewhat less than the length of the stroke required to switch over the control valve assembly 6. As a result, the shut-off piston 62 moves upon each application of the brakes and thus cannot corrode or seize due to inactivity.

The piston rod 46 of the shut-off piston 62 is provided with an outwardly tapering section 66 which projects through an annular seal 67 mounted adjacent to the open extremity of a relief bore 61, through which the bore can communicate with piston chamber 60. In this manner, the piston rod 46 comes into sealing contact with the annular seal 67 when the shut-off piston 62 is moved by the control plunger 65 inwardly of the housing (toward the left in the drawing).

In the relief bore 61 there is disposed a spring 68 which exerts force upon the shut-off piston 62. The piston rod 46 actuates rod 45 through the intermediary action of a ball 69, thus enabling a definite overstroke by the shut-off piston 62.

The outward end of the control valve assembly 6 remote from the shut-off piston 62 is provided with a conically-shaped rubber bumper 70 to act as an excursion-limiting member which bumper 70 is disposed between the cap 21 and a flange 71 on the cap 21 which comprises a bumper-retaining member.

It will be further noted that stops 72 and 73 are provided on the cap 21 for the crossbar 24, so that the crossbar is not greatly deflected from the vertical when there is an inequality of pressure between the two work chambers 31 and 32. In addition, there are return springs 74 and 75 provided on the push rods 25 and 26, and a guide rod 76 serves to align and support travel of the cap 21.

MODE OF OPERATION

The pressure directed by the brake pedal 23 via the excursion-limiting spring 70 and the control valve 6 porceeds into the primary chamber of the main brake cylinder pistons 27 and 28 and simultaneously arrives at the primary side 77 of the shut-off piston 62. Under this effective pressure a motion is performed which is transmitted via the ball 69 onto the brake light switch 42. When the annular seal 67 and the check valves 56, 57 are intact, the shut-off piston 62 acts upon a practically incompressible chamber, which excludes the possibility of a further stroke movement. When full pressure is directed into the chamber, the second switch position of the switch 42 cannot be attained if there is no defect present. In accordance with the description of the advantages of the invention above, the stop action of the shut-off mechanism, i.e., shut-off piston 62 is eliminated when the supply pressure in the reservoir 51 is below a certain level, by means of opening the two check valves 56, 57. The two pistons 47 and 48 actuate the two switches 40 and 41, of which the charge function switch 40 is responsible for the levels of the reservoir charge when the reservoir is charged by a electromotor, and the pressure deficiency switch 41 is responsible for a warning signal whenever the pressure drops to a certain lower level. In the case of a pump driven by the internal combustion engine or other units, the response threshold of the switch 40 should lie above the level of the response value of the switch 41. Both switch signals can be evaluated as to their function in a simple electronic circuit. If, for example, the switch 40 (small value) responds and the switch 41 associated with a higher response value furnishes no signal, then switch 41 is defective. The switch 40 as well can be monitored electronically as to its function, by means of the charging time of the reservoir 51, which is characterized by the switching signal of the switch 41. In this case the basis for monitoring is that in reservoir brake systems, for instance when there is a relatively long period of disuse, the reservoir is completely emptied, which then results in a corresponding reservoir charging time. During the reservoir charging, then, a signal is present from switch 41. If this signal is monitored over a certain period of time, and if during this period the signal of switch 40 does not respond, then this is a clear indication of a defect in switch 40 or in the piston motion. In a similar manner, the signal of the brake light switch 42 also can be monitored. If, within a relatively short time two reservoir refill precedures take place (response of switch 41), then as a rule a braking procedure must be the cause for the removal of pressure medium form the reservoir 51. In this event, the signal of switch 42 must be present during this monitoring period. If this is not the case, then again a defect is present. The switching signals of switches 39, 40, 41 and 42 are preferably collected in one monitoring apparatus, which in electornic anti-locking systems is known as the so-called "black box". In this way, it is possible to combine these signals with anti-locking signals of an anti-locking mechanism.

Beyond this described manner of operation, the illustrated brake booster also has the following advantages:

The return springs 74 and 75 which surround the push rods 25 and 26, respectively, are intended to guide the return of the main cylinder pistons 27 and 28, respectively, and are not located in the main brake cylinder chamber, but rather outside of it. This solution provides considerable advantages with respect to the capacity for ventilation of the main cylinder chambers. In addition, a guide rod 76 is used in the described apparatus by means of which the piston rods 25 and 26 remain free from any shearing forces. Such a solution has the advantage that a crossbar 24 can be used which, should the energy supply fail, provides identical pressure in both brake circuits I and II when the main brake cylinder pistons 27 and 28 are mechanically actuated. This crossbar 24, beacuse of the stops 72, 73, possesses a limited compensatory effect so that in case of a double failure of both energy source and brake circuit, the force can be applied virtually entirely to increase the pressure in one brake circuit.

The foregoing relates to a preferred embodiment of the invention, it being understood that other embodiments and variants thereof are possible within the spirit and scope of the invention, the latter being defined by the appended claims.

What is claimed and desired to be secured by letters patent of the United States is:

1. A hydraulic brake booster for a vehicle brake system having a control valve actuated by a brake pedal via an excursion-limiting spring and arranged to monitor both a connection between a supply source and a primary cylinder in said hydraulic brake booster, further including a primary cylinder piston and a connection between said primary cylinder and a relief point, said system further having a shut-off mechanism for said excursion-limiting spring which responds upon a failure of supply pressure, further wherein said shut-off mechanism includes a piston member movable in accordance with motion of the control valve and to which piston member a motion pulse can be imparted in the area of its normal position.

2. A hydraulic brake booster in accordance with claim 1, which includes at least one valve means wherein said piston member of said shut-off mechanism can be made ineffective by said at least one valve means.

3. A hydraulic brake booster in accordance with claim 2, further wherein said control valve exerts a brake pressure which is effective on both sides of said valve means.

4. A hydraulic brake booster in accordance with claim 1, further wherein said piston member of said shut-off mechanism operates a brake light switch.

5. A hydraulic brake booster in accordance with claim 4, further wherein said system further includes monitoring means comprising switch means and first and second reservoir pressure pistons for operating said switch means.

6. A hydraulic brake booster in accordance with claim 1, further wherein said primary cylinder includes at least a pair of piston members coupled together via a crossbar.

7. A hydraulic brake booster in accordance with claim 1, further wherein said booster includes a housing, said housing being covered by a cap element, said cap being arranged to support plural switch means.

8. A hydraulic brake booster in accordance with claim 7, further wherein said plural switch means are associated with a monitoring apparatus, said plural switch means being arranged to emit signals to indicate errors in the event of non-occurrence of piston motion, defective contact and/or deficient output of said supply source.

9. A hydraulic brake booster in accordance with claim 8, further wherein said monitoring apparatus is also capable of evaluating anti-locking signals of an anti-locking apparatus.

* * * * *